(12) United States Patent
Kim

(10) Patent No.: US 11,092,876 B2
(45) Date of Patent: Aug. 17, 2021

(54) CAMERA MODULE AND PORTABLE ELECTRONIC DEVICE

(71) Applicant: Samsung Electro-Mechanics Co., Ltd., Suwon-si (KR)

(72) Inventor: Gyu Won Kim, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 285 days.

(21) Appl. No.: 16/386,502

(22) Filed: Apr. 17, 2019

(65) Prior Publication Data

US 2020/0012168 A1 Jan. 9, 2020

(30) Foreign Application Priority Data

Jul. 6, 2018 (KR) .................. 10-2018-0078591

(51) Int. Cl.
| | |
|---|---|
| *G03B 5/00* | (2021.01) |
| *G03B 13/36* | (2021.01) |
| *G02B 7/09* | (2021.01) |
| *G02B 27/64* | (2006.01) |

(52) U.S. Cl.
CPC .............. *G03B 5/00* (2013.01); *G02B 7/09* (2013.01); *G02B 27/646* (2013.01); *G03B 13/36* (2013.01); *G03B 2205/0015* (2013.01); *G03B 2205/0076* (2013.01)

(58) Field of Classification Search
None
See application file for complete search history.

(56) References Cited

U.S. PATENT DOCUMENTS

| | | | | |
|---|---|---|---|---|
| 7,688,533 | B2* | 3/2010 | Wada | ...................... F03G 7/065 |
| | | | | 359/823 |
| 7,961,414 | B2* | 6/2011 | Matsuki | ............. G02B 23/2438 |
| | | | | 359/824 |
| 9,001,269 | B2 | 4/2015 | Chiu | |
| 9,723,211 | B2 | 8/2017 | Sekimoto | |
| 9,753,300 | B2 | 9/2017 | Howarth | |
| 2001/0022688 | A1* | 9/2001 | Kosaka | ..................... G03B 5/00 |
| | | | | 359/557 |
| 2006/0098968 | A1* | 5/2006 | Ito | ........................ G02B 7/102 |
| | | | | 396/85 |

(Continued)

FOREIGN PATENT DOCUMENTS

| | | |
|---|---|---|
| KR | 10-2015-0013555 A | 2/2015 |
| KR | 10-2016-0088859 A | 7/2016 |

(Continued)

*Primary Examiner* — Derek S. Chapel
(74) *Attorney, Agent, or Firm* — NSIP Law

(57) ABSTRACT

A camera module includes a support structure having an internal space, a first movable body movably disposed inside the support structure, a second movable body elevatably disposed in an internal space of the first movable body, and a driving unit disposed in at least one of a space between the support structure and the first movable body and a space between the first movable body and the second movable body. The driving unit includes a driving wire, formed of a shape memory alloy, and a spring disposed to overlap the driving wire. The first and second movable bodies are moved by driving force applied in one direction by the driving wire, and driving force applied in another direction by the spring.

16 Claims, 9 Drawing Sheets

(56) References Cited

U.S. PATENT DOCUMENTS

2007/0137196 A1* 6/2007 Hamaguchi ............. G03B 5/00
  60/527
2017/0285362 A1   10/2017 Hu et al.

FOREIGN PATENT DOCUMENTS

| KR | 10-2017-0082509 A | 7/2017 |
| KR | 10-1770856 B1 | 9/2017 |
| WO | WO 2011/104518 A1 | 9/2011 |
| WO | WO 2013/175197 A1 | 11/2013 |
| WO | WO 2015/036761 A1 | 3/2015 |
| WO | WO 2016/075606 A1 | 5/2016 |

* cited by examiner $$\Delta y = y - \sqrt{(0.978\sqrt{x^2+y^2})^2 - x^2}$$

CAMERA MODULE AND PORTABLE ELECTRONIC DEVICE

CROSS-REFERENCE TO RELATED APPLICATIONS

This application claims the benefit under 35 U.S.C. 119(a) of Korean Patent Application No. 10-2018-0078591 filed on Jul. 6, 2018, in the Korean Intellectual Property Office, the entire disclosure of which is incorporated herein by reference for all purposes.

BACKGROUND

1. Field

This application relates to a camera module and portable electronic device.

2. Description of the Background

Recently, camera modules have been installed in portable electronic devices such as tablet personal computers (PCs), laptop computers, and the like, in addition to smartphones, and an autofocusing (AF) function, an optical image stabilization (OIS) function, a zoom function, and the like, have been added to the camera modules.

However, to implement various functions, structures of camera modules have become relatively complex and sizes of the camera modules have been increased, resulting in difficulty in mounting camera modules in portable electronic devices in which camera modules are to be mounted.

With the growth in smartphone camera market, there have been attempts to miniaturize and integrate functions of typical cameras such as autofocusing (AF), optical zoom, and the like accompanying an OIS driving method. Accordingly, structural diversification leads to creation of a demand for OIS driving methods other than the existing OIS driving method.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a support structure having an internal space, a first movable body movably disposed inside the support structure, a second movable body elevatably disposed in an internal space of the first movable body, and a driving unit disposed in at least one of a space between the support structure and the first movable body and a space between the first movable body and the second movable body. The driving unit includes a driving wire formed of a shape memory alloy, and a spring disposed to overlap the driving wire. The first and second movable bodies are moved by driving force applied in one direction by the driving wire, and driving force applied in another direction by the spring.

The driving unit may include a plurality of optical image stabilization (OIS) driving units configured to drive the first movable body and an autofocusing (AF) driving unit configured to drive the second movable body.

The plurality of OIS driving units may be disposed on two adjacent side surfaces of the first movable body.

The plurality of OIS driving units may include first and second OIS driving units connected to one side surface of the first movable body, and third and fourth OIS driving units connected to another side surface of the first movable body.

The first OIS driving unit may have one end connected to an installation bar of the support structure, and the other end connected to a first mounting tool disposed in a central portion of the one side surface of the first movable body.

The first, second, third, and fourth OIS driving units may include first, second, third, and fourth OIS driving wires, respectively, each having one end connected to the installation bar of the support structure and the other end connected to the first mounting tool, and first, second, third, and fourth OIS coil springs, respectively, each disposed in such a manner that the first, second, third, and fourth OIS driving wires penetrate through the corresponding first, second, third, and fourth OIS coil springs, each having one end connected to the installation bar and the other end connected to the first mounting tool.

The installation bar may be disposed on an edge side of the internal space of the support structure, and the first mounting tool may include a plurality of first mounting tools fixedly installed on two side surfaces of the first movable body.

The plurality of first mounting tools may be disposed to be spaced apart from each other in a height direction of the movable body.

The installation bar may be disposed on an edge side of the internal space of the support structure, and the first mounting tool may include a guide member disposed on two side surfaces of the first movable body, and a sliding member slidably installed on the guide member.

The AF driving unit may have one end connected to an internal surface of the first movable body, and another end connected to an external surface of the second movable body.

The AF driving unit may include an AF driving wire having one end connected to the internal surface of the first movable body and the other end connected to the external surface of the second movable body, and an AF coil spring disposed in such a manner that the AF driving wire penetrates through the AF coil spring, the AF coil spring having one end connected to the internal surface of the first movable body and the other end connected to the external surface of the second movable body.

The AF driving unit may include a plurality of AF driving units arranged in a 'V' shape.

A ball member, disposed on an opposite side of the second movable body from the AF driving unit, may be disposed on one of the first and second movable bodies.

The spring may include a leaf spring.

The direction and the other direction may be opposing directions.

The camera module may be a portable electronic device, further including an image sensor configured to convert light incident through a lens disposed in the second movable body to an electrical signal, and a display unit disposed on a surface of the portable electronic device to display an image based on the electrical signal.

In another general aspect, a camera module includes a support structure comprising an internal space, a movable body movably disposed inside the support structure, and a driving unit disposed in a space between the support structure and the movable body. The driving unit includes a driving wire formed of a shape memory alloy, and a spring disposed to overlap the driving wire, and the movable body is moved by driving force applied in one direction by the driving wire, and driving force applied in another direction by the spring.

The driving unit may include an optical image stabilization (OIS) driving unit configured to drive the movable body substantially perpendicular to an optical axis direction.

The driving unit may include an autofocusing (AF) driving unit configured to drive the movable body in an optical axis direction.

The camera module may be a portable electronic device, further including an image sensor configured to convert light incident through a lens disposed in the movable body to an electrical signal and a display unit disposed on a surface of the portable electronic device to display an image based on the electrical signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
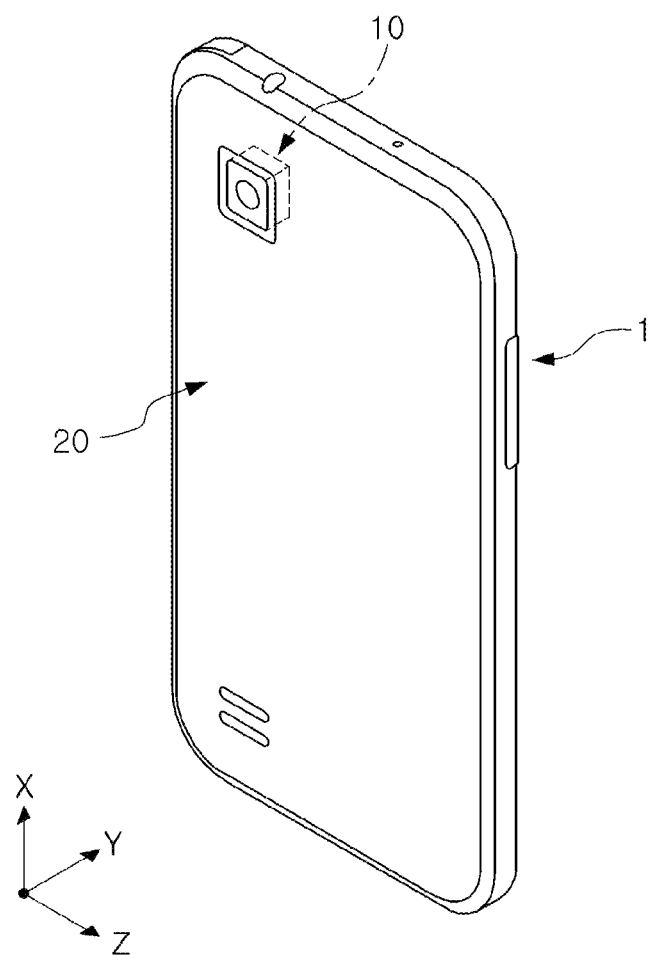
FIG. 1 is a perspective view of a portable electronic device according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto An aspect of the present disclosure is to provide a camera module which may obtain a stroke capable of driving an OIS system within a limited size of the camera module by using a shape memory alloy.

FIG. 1 is a perspective view of a portable electronic device according to one or more examples.

Referring to FIG. 1, a portable electronic device 1 according to an example may be a mobile communications terminal, a smartphone, a tablet personal computer (PC), a wearable device such as a smartwatch, a vehicle mounted device, or the like, in which a camera module 10 is mounted.

As illustrated in FIG. 1, the portable electronic device 1 is provided with the camera module 10 to capture an image of a subject.

In the present example, the camera module 10 includes a plurality of lenses, and an optical axis (a Z-axis) of the lenses is directed in a thickness direction of the portable electronic device 1 (a Y-axis direction or a direction from a front surface of the portable electronic device 1 to a rear surface thereof or an opposite direction to the direction from the front surface of the portable electronic device to the rear surface thereof).

The portable electronic device 1, may further include a display unit 20, wherein the camera module 10 is installed as a front camera of the portable electronic device 10 along with the display unit 20 or as a back camera on a side of the portable electronic device 10 other than a side with the display unit 20. In an example, light incident through the lenses may impinge on an image sensor. An electrical signal converted by the image sensor of the camera module 10 may be output as an image via the display unit 20 of the portable electronic device 10.

As described later, the camera module 10 may allow autofocusing (AF) or optical image stabilization (OIS) to be driven by a driving unit 160 (see FIGS. 2 to 4).

Figure 2:
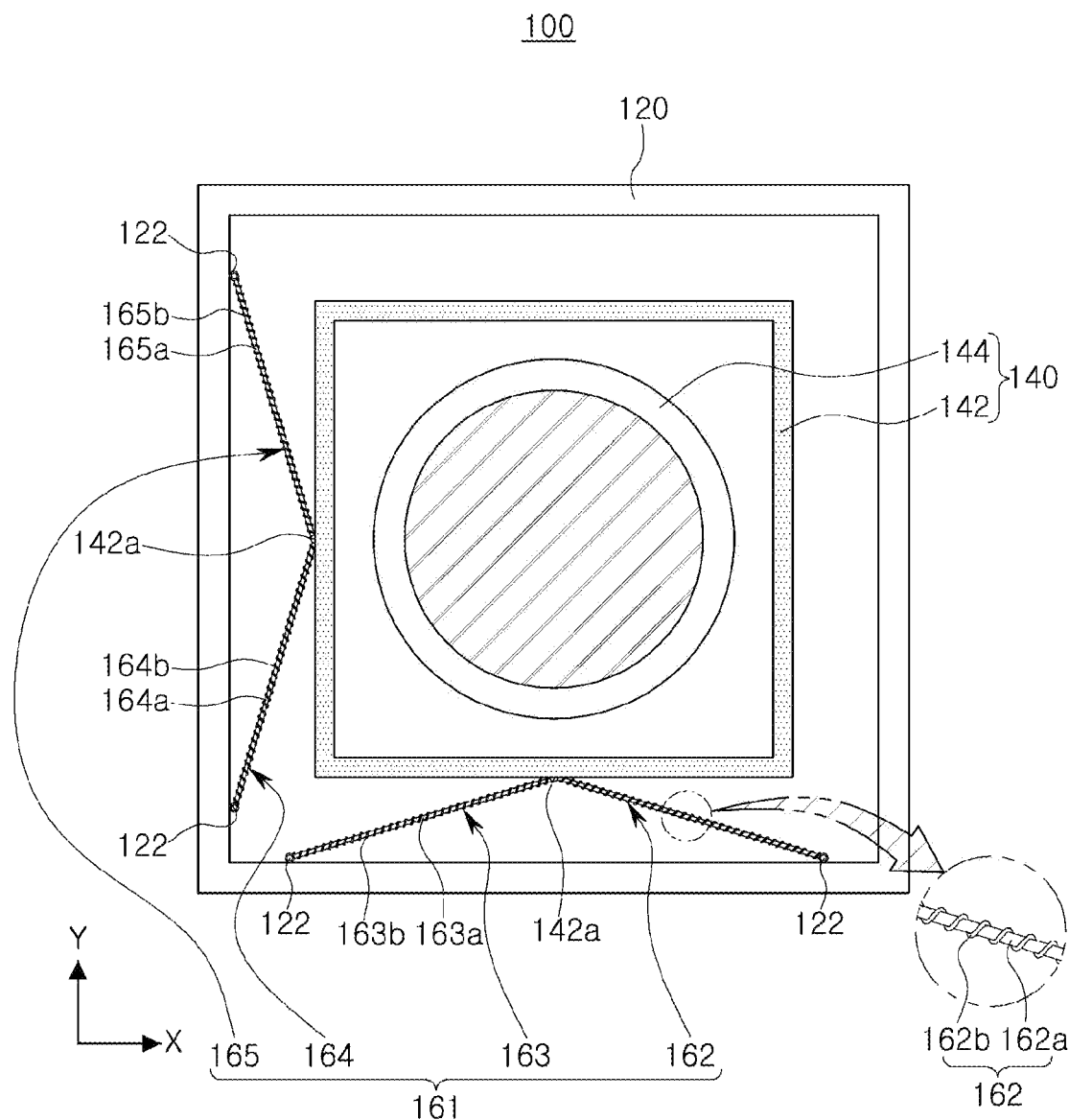
FIG. 2 is a schematic configuration diagram of a camera module according to one or more examples.
Figure 3:
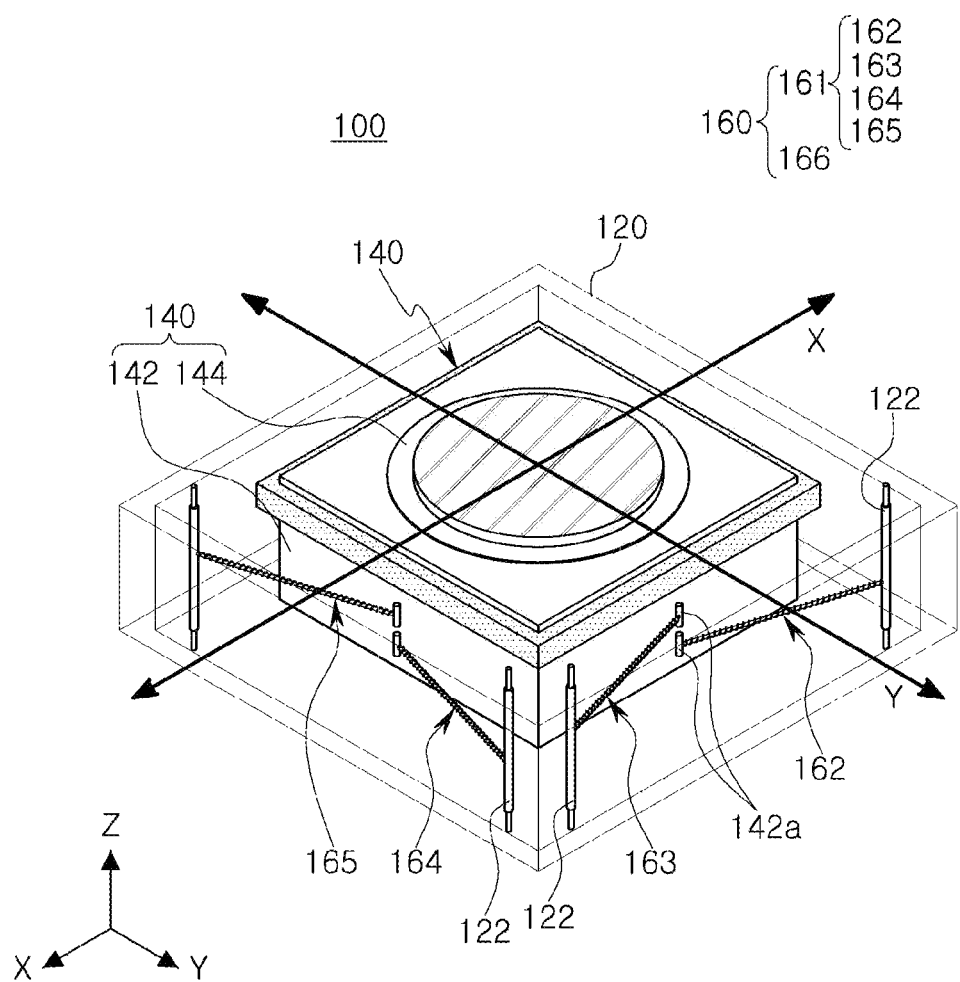
FIG. 3 is an enlarged view of a portion of the camera module according to the one or more examples.
Figure 4:
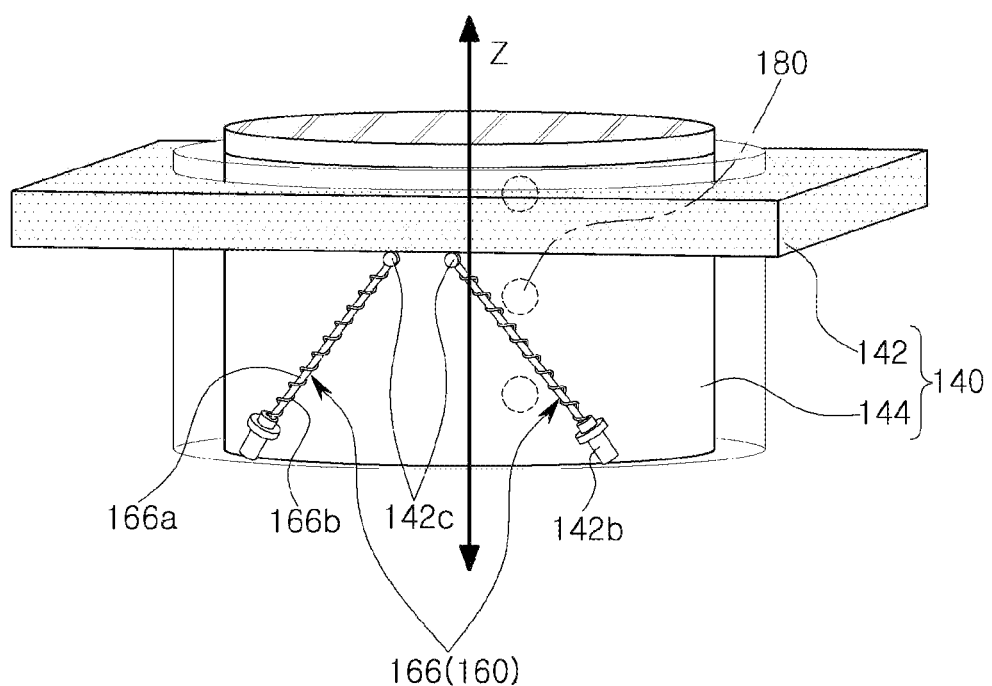
FIG. 4 is a configuration diagram illustrating first and second movable bodies and a driving unit for autofocusing (AF) of a camera module according to the one or more examples.

FIG. 2 is a schematic configuration diagram of a camera module according to a first example, FIG. 3 is an enlarged view of a portion of the camera module according to the first example, and FIG. 4 is a configuration diagram illustrating first and second movable bodies and an AF driving unit of a camera module according to the first example.

Referring to FIGS. 2 to 4, a camera module 100 according to the first example may be configured to include, as an example, a support structure 120, a movable body 140, and a driving unit 160.

The support structure 120 has an internal space. As an example, the support structure 120 may have a hexahedral shape with open top and bottom surfaces. As an example, the support structure 120 may have a bottom surface in which a through-hole, not illustrated, is formed. The support structure 120 may be fixedly mounted on a printed circuit board, not illustrated, in such a manner that an image sensor, not illustrated, is disposed at a lower portion of the through-hole.

At least two internal surfaces of the support structure 120 may be provided with an installation bar 122 for installing the driving unit 160. As an example, each internal surface of the support structure 120 may be provided with two installation bars 122, and another adjacent internal surface of the support structure 120 may be provided with another two installation bars 122.

The movable body 140 is movably installed in the internal space of the support structure 120. As an example, the movable body 140 may include a first movable body 142, moving in the internal space of the support structure 120 in two axis directions (for example, X-axis and Y-axis directions), and a second movable body 144 moving in one axis direction (for example, a Z-axis direction) on the basis of the first movable body 142.

The first movable body 142 may have a substantially hexahedral shape. At least two side surfaces of external surfaces of the first movable body 142 may be provided with a first mounting tool 142a for mounting an OIS driving unit 161 to be described later. As an example, each side surface of the first movable body 142 may be provided with two first mounting tools 142a. As an example, two first mounting tools 142a may be disposed in a straight line in a height direction of the first movable body 142. Further, one side surface of internal surfaces of the first movable body 142 may be provided with two second mounting tools 142b disposed adjacent to an edge side of the first movable body 142.

A plurality of lenses, not illustrated, may be installed inside the second movable body 144. An upper end portion of an external surface of the second movable body 144 may be provided with two third mounting tools 142c. The third mounting tools 142c may be disposed adjacent to each other.

A case, in which a lower end portion of the second movable body 144 has a cylindrical shape, is illustrated as an example, but the present disclosure is not limited to such a case and a shape of the second movable body 144 may be variously modified.

The external surface of the second movable body 144 and the internal surface of the first movable body 142 may be provided with at least one ball member 180 for smoothly moving the second movable body 144. As an example, the ball member 180 may be disposed at an opposite side of an AF driving unit 166 to be described later. Further, a plurality of the ball members 180 may be disposed in the height direction of the second movable body 144.

A plurality of driving units 160 may be provided. The driving unit 160 may include an OIS driving unit 161 for driving the first movable body 142 and an AF driving unit 166 for driving the second movable body 144. The OIS driving unit 161 includes first and second OIS driving units 162 and 163, connected to one side surface of the first movable body 142, and third and fourth OIS driving units 164 and 165 connected to another side surface of the first movable body 142. The first OIS driving unit 162 may include a first OIS driving wire 162a, having one end connected to an installation bar 122 and the other end connected to the first mounting tool 142a, and a first OIS coil spring 162b, disposed in such a manner that the first OIS driving wire 162a penetrates therethrough, having one end connected to the installation bar 122 and the other end connected to the first installation tool 142a. That is, the first OIS coil spring 162b has one end connected to the installation bar 122 and the other end connected to the first installation tool 142a.

As described above, since the first OIS driving unit 162 includes the first OIS driving wire 162a and the first OIS coil spring 162b, the movable body 140 may be moved using force, generated by contraction of the first OIS coil spring 162b, and restoring force for extending the first OIS coil spring 162b. This will be described in detail later.

The first OIS driving unit 162 and the second OIS driving unit 163 may be connected to each other at different heights in a height direction of the movable body 140. Furthermore, the first OIS driving unit 162 and the second OIS driving unit 163 may be connected at different heights in a height direction of the installation bar 122.

The second, third, and fourth OIS driving units 163, 164, and 165 may also include second, third, and fourth OIS driving wires 163a, 164a, and 165a, each having one end connected to the installation bar 122 and the other end connected to the first mounting tool 142a, and second, third, and fourth OIS coil springs 163b, 164b, and 165b disposed in such a manner that the second, third, and fourth OIS driving wires 163a, 164a, and 165a penetrate therethrough, respectively.

The AF driving unit 166 has one end connected to the internal surface of the first movable body 142, and the other end connected to the external surface of the second movable body 144. As an example, the AF driving unit 166 includes an AF driving wire 166a, having one end connected to the internal surface of the first movable body 142 and the other end connected to the external surface of the second movable body 144, and an AF coil spring 166b, disposed in such a manner that the AF driving wire 166a penetrates therethrough, having one end connected to the internal surface of the first movable body 142 and the other end connected to the external surface of the second movable body 144.

An example maximum stroke of the first movable body 142, obtained by the first, second, third, and fourth OIS driving wires 162a, 163a, 164a, and 165a, will be described with reference to accompanying drawings.

Figure 5:
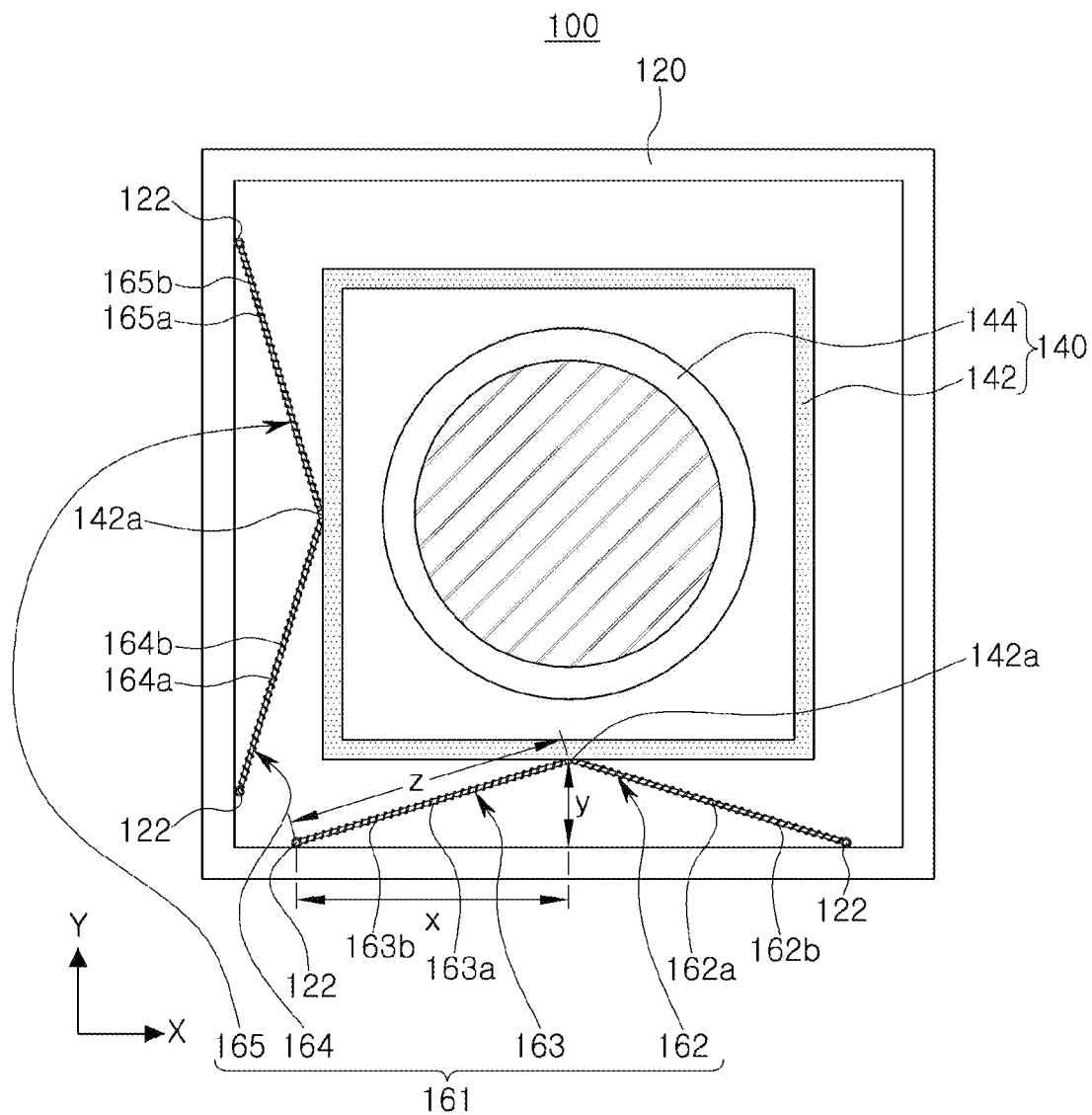
FIG. 5 is an explanatory view illustrating strokes of the first and second movable bodies and the driving unit for AF of the camera module according to the one or more examples.
Figure 5:
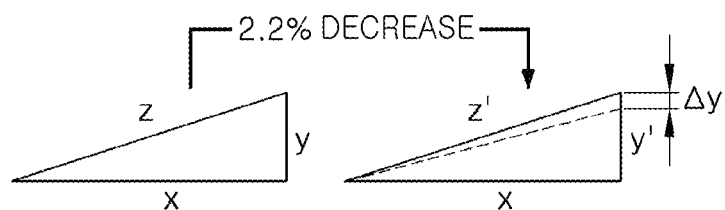

As illustrated in FIG. 5, a length of the first OIS driving wire 162a is z, a distance between the first movable body 142 and the support structure 120 is y, and a bottom surface is x. When the length of the first OIS driving wire 162a is decreased by 2.2% (a maximum contraction ratio of the first OIS driving wire 162a), $\Delta y$ is a stroke.

The stroke $\Delta y$, depending on x and y, is illustrated in a table below.

TABLE (1)

| y (mm) | x (mm) | $\Delta y$ (Stroke, mm) |
|---|---|---|
| 0.5 | 2.3 | 0.405547 |
| 0.6 | 2.8 | 0.543708 |
| 0.7 | 3.2 | 0.548101 |
| 0.8 | 3.7 | 0.671876 |
| 0.9 | 4.2 | 0.815562 |
| 1 | 4.6 | 0.811094 |

As an example, the ball member 180 may be disposed on an opposite side of a region in which the AF driving unit 166 is disposed. Moreover, a plurality of the ball members 180 may be spaced apart from each other in a moving direction of the second movable body 144.

A case, in which three ball members 180 are provided, has been described in the present example, but the present disclosure is not limited to the case and the number of the ball members 180 may be two or four or more.

Hereinafter, the operation of a camera module according to the first example will be described in brief with reference to FIGS. 6 and 7.

First, an example of OIS driving will be described. To move the first movable body 142 in a right direction of the X-axis in FIG. 6, the third and fourth OIS driving wires 164a and 165a of the third and fourth OIS driving units 164 and 165 of the OIS driving unit 161 are extended (relaxed). For example, the third and fourth OIS coil springs 164b and 165b of the third and fourth OIS driving units 164 and 165 of the OIS driving unit 161 are relaxed. In this case, the first OIS driving wire 162a of the first OIS driving unit 162 is contracted, while the second OIS driving wire 163a of the second OIS driving unit 163 is extended (relaxed). For example, the first OIS coil spring 162b of the first OIS driving unit 162 is contracted, while the second OIS coil spring 163b of the second OIS driving unit 163 is relaxed.

Figure 6:
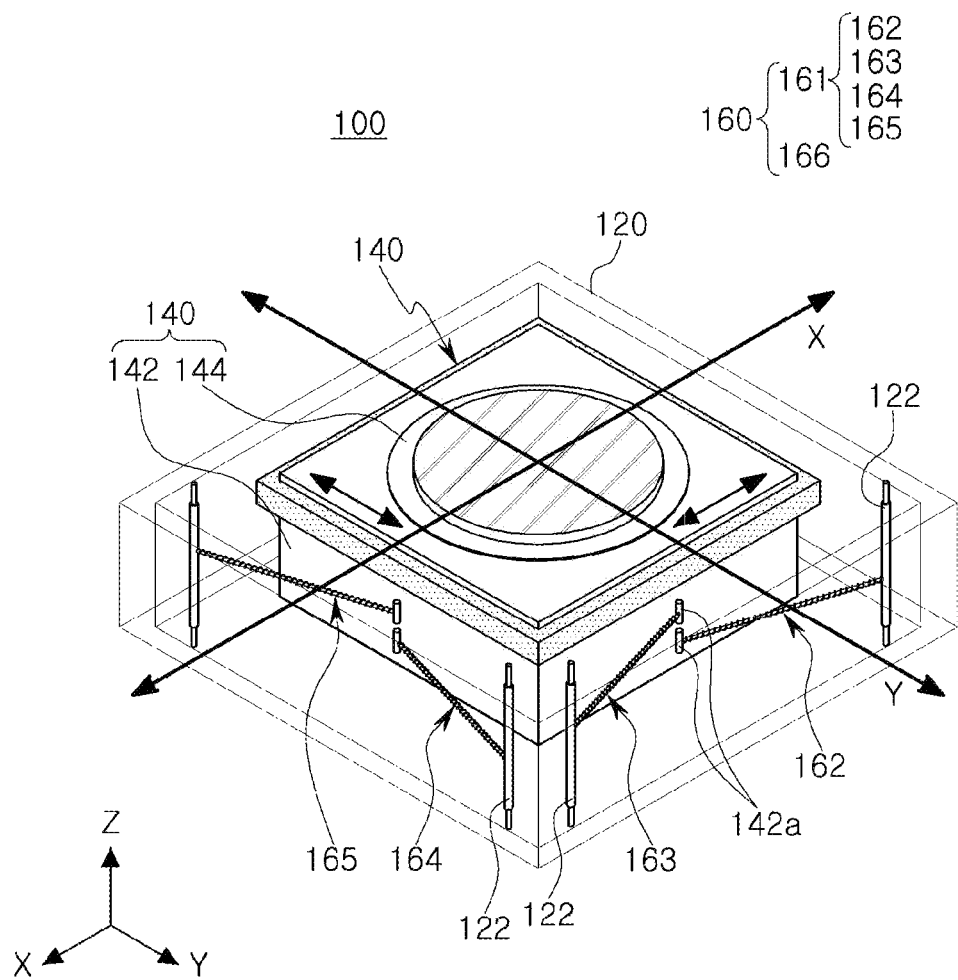
FIGS. 6 and 7 are explanatory views illustrating operation of the camera module according to the one or more examples.
Figure 7:
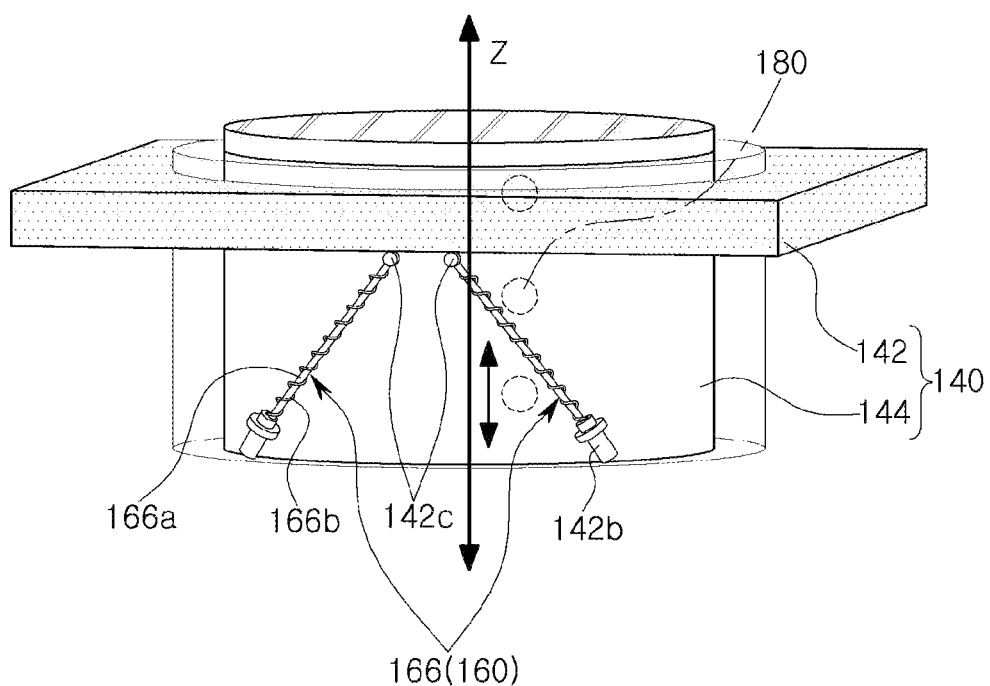

To move the first movable body 142 in a downward direction of the Y-axis in FIG. 6, the first and second OIS driving wires 162a and 163a of the first and second OIS driving units 162 and 163 are contracted. In this case, the third OIS driving wire 164a of the third OIS driving unit 164 is contracted, while the fourth OIS driving wire 165a of the fourth OIS driving unit 165 is relaxed.

Next, an example of AF driving will be described. To move the second movable body 144 in an upward direction of the Z-axis in FIG. 7, a pair of AF driving wires 166a of the AF driving unit 166 is relaxed. Further, to move the second movable body 144 in a downward direction of the Z-axis in FIG. 7, the pair of AF driving wires 166a of the AF driving unit 166 is contracted. During the AF driving, the second movable body 144 may be elevated more smoothly by the ball member 180.

As described above, a stroke capable of driving the OIS system may be obtained through a spring and a driving wire formed of the shape memory alloy. Further, since the driving unit includes the spring and the driving wire formed of a shape memory alloy, material costs may be reduced during manufacturing and a manufacturing process may be simplified.

Hereinafter, modified examples of the camera module according to the present disclosure will be described. However, the same components as those described above are denoted by the same reference numerals as those used above, and a further detailed description thereof may be omitted.

Figure 8:
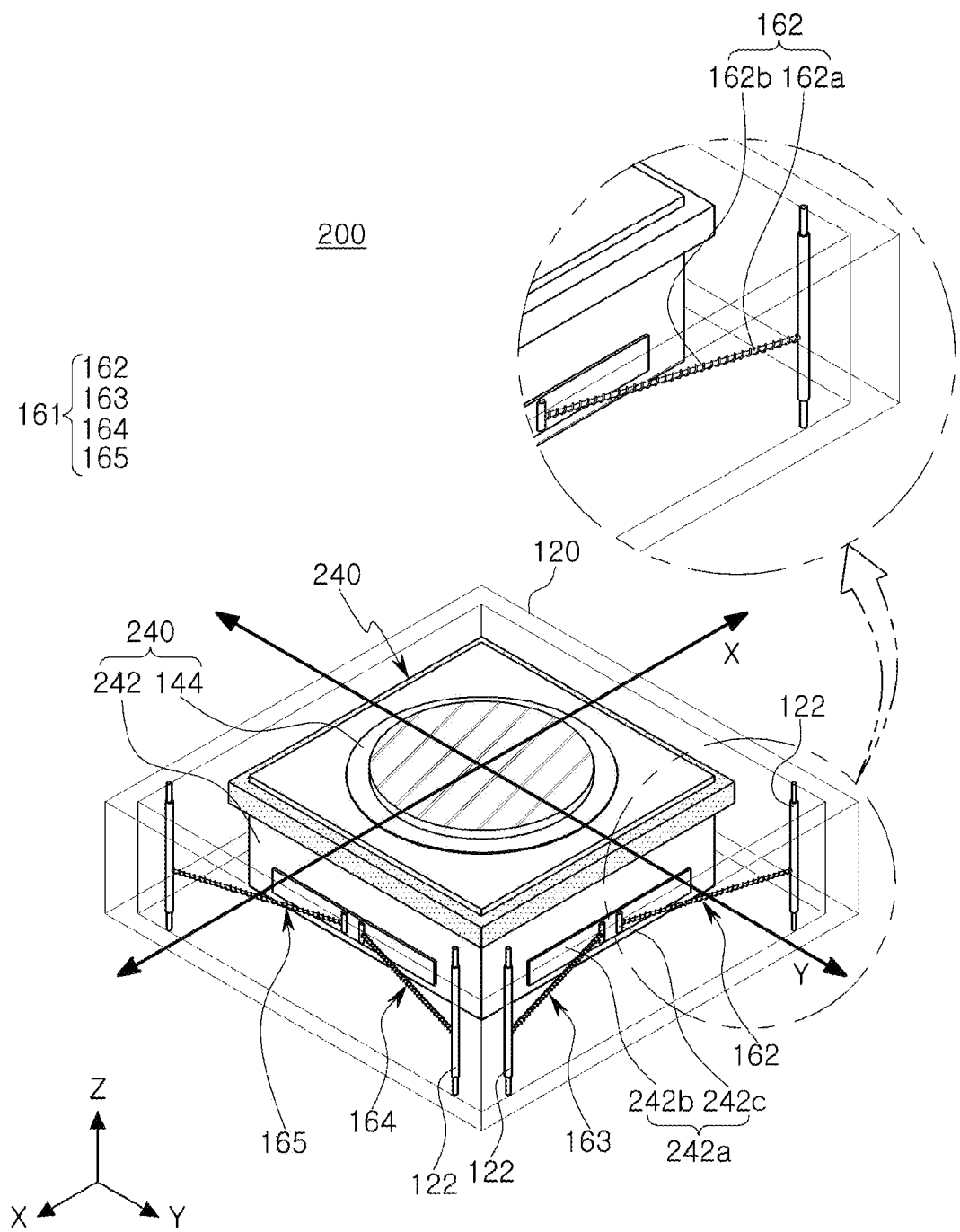
FIG. 8 is a schematic perspective view of a camera module according to one or more other examples.

FIG. 8 is a schematic perspective view of a camera module according to a second example.

Referring to FIG. 8, the camera module 200 according to the second example includes, as an example, a support structure 120, a movable body 240, and a driving unit 160.

The support structure 120 and the driving unit 160 are the same as those described above, and further detailed descriptions thereof may be omitted.

The movable body 240 is movably installed in an internal space of the support structure 120. As an example, the movable body 240 may include a first movable body 242, moved in the internal space of the support structure 120 in two axis directions (for example, X-axis and Y-axis directions), and a second movable body 144 (see FIG. 4) moved in one axial direction (for example, a Z-axis direction).

The first movable body 242 may have a substantially hexahedral shape. At least two side surfaces of the external surface of the first movable body 242 may be provided with a first mounting tool 242a for mounting an OIS driving unit 161 to be described later. The first mounting tool 242*a* may include a guide member 242*b* and a sliding member 242*c* slidably movable to the guide member 242*b*.

Each of the first and second OIS driving units 162 and 163 and the third and fourth OIS driving units 164 and 165 has one end connected to an installation mounting bar 122 of the support structure 120, and the other end connected to the sliding member 242*c*.

Hereinafter, an example OIS driving method using the OIS driving unit will be described in brief. To move the first movable body 242 in the Y-axis direction, the OIS driving wire 162*a* of the first OIS driving unit 162 and the second OIS driving wire 163*a* of the second OIS driving unit 163 are contracted and/or relaxed. In this case, the third and fourth OIS driving wires 164*a* and 165*a* of the third and fourth OIS driving units 164 and 165 are slidably moved without being contracted and relaxed.

When the first movable body 242 moves in the X axis direction, the third OIS driving wire 164*a* of the third OIS driving unit 164 and the fourth OIS driving wire 165*a* of the fourth OIS driving unit 165 are contracted and/or relaxed. In this case, the first and second OIS driving wires 162*a* and 163*a* of the first and second OIS driving units 162 and 163 are slidably moved without being contracted and relaxed.

The second movable body 144 is the same as described above, and further detailed description thereof may be omitted.

Figure 9:
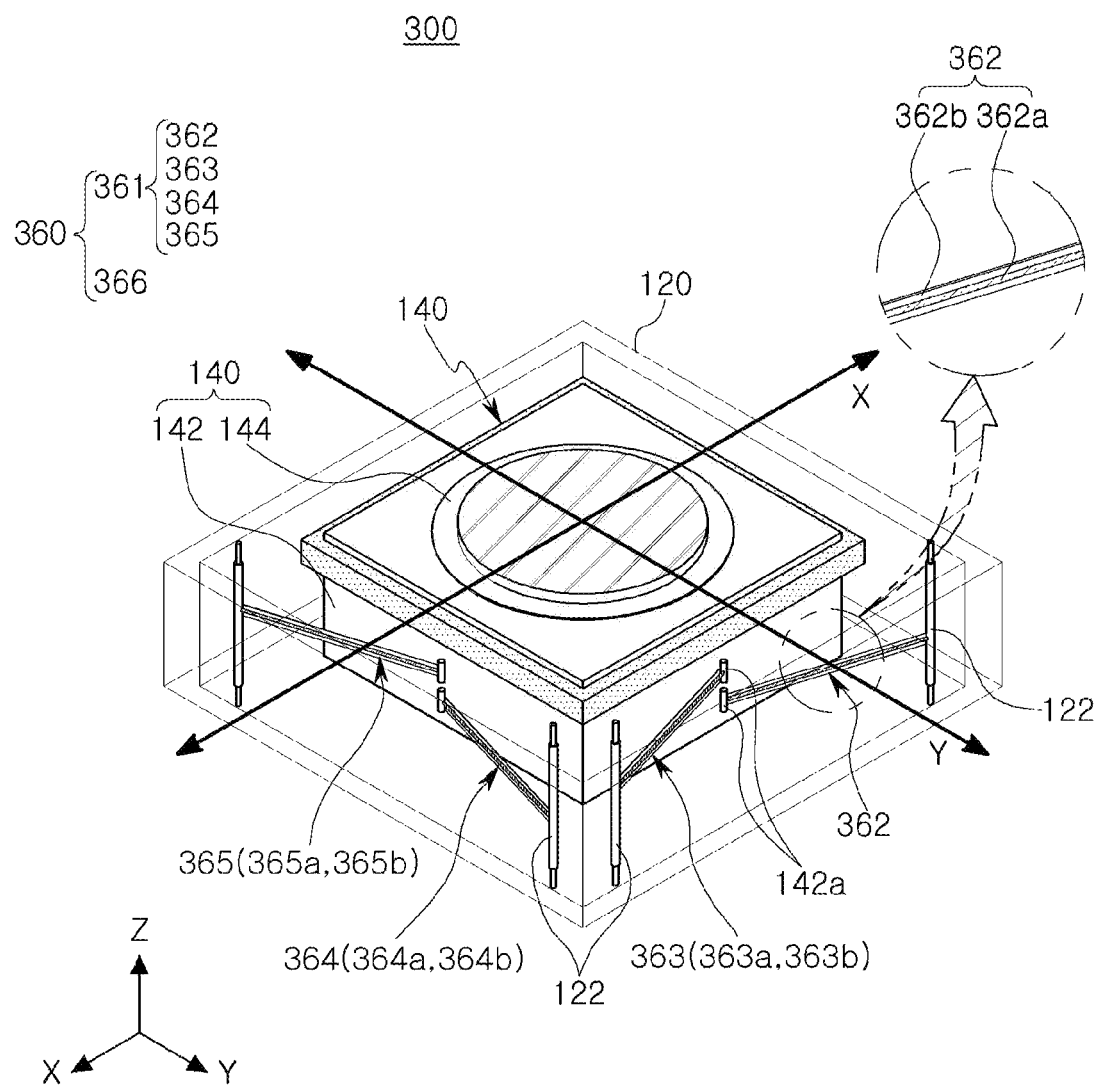
FIG. 9 is a schematic perspective view of a camera module according to one or more still other examples.

FIG. 9 is a schematic perspective view of a camera module according to a third example.

Referring to FIG. 9, a camera module 300 according to the third example may be configured to include a support structure 120, a movable body 140, and a driving unit 360.

A plurality of driving units 360 may be provided. The driving unit 360 may include an OIS driving unit 361 for driving the first movable body 142 and an AF driving unit 366 for driving the second movable body 144. The OIS driving unit 361 may include first and second OIS driving units 362 and 363, connected to one side surface of the first movable body 142, and third and fourth OIS driving units 364 and 365 connected to the other side surface of the first movable body 142. The first driving unit 361 may include a first OIS driving wire 362*a*, having one end connected to the installation bar 122 and the other end connected to the first mounting tool 142*a*, and a first OIS leaf spring 362*b*, disposed in such a manner that the first OIS driving wire 362*a* penetrates therethrough, having one end connected to the installation bar 122 and the other end connected to the first installation tool 142*a*.

As described above, since the first OIS driving unit 362 includes the first OIS driving wire 362*a* and the first OIS leaf spring 362*b*, the first movable body 140 may be moved using force, generated by contraction of the first OIS driving wire 362, and restoring force for restoring the first OIS leaf spring 362 to an original shape.

The first OIS driving unit 362 and the second OIS driving unit 363 are connected at different heights in a height direction of the movable body 140. Further, the first OIS driving unit 362 and the second OIS driving unit 363 may be connected at different heights in a height direction of the installation bar 122.

The second, third, and fourth OIS driving units 363, 364, and 365 may also include second, third, and fourth OIS driving wires 363*a*, 364*a*, and 365*a*, each having one end connected to the installation bar 122 and the other end connected to the first mounting tool 142*a*, and second, third, and fourth OIS leaf springs 363*b*, 364*b*, and 365*b* disposed in such a manner that the second, third, and fourth OIS driving wires 363*a*, 364*a*, and 365*a* penetrate therethrough, respectively.

As described above, a stroke capable of driving an OIS system may be obtained within a camera module having a limited size by using a shape memory alloy.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a support structure comprising an internal space;
a first movable body movably disposed inside the support structure;
a second movable body elevatably disposed in an internal space of the first movable body; and
a driving unit disposed in at least one of a space between the support structure and the first movable body and a space between the first movable body and the second movable body,
wherein the driving unit comprises a driving wire formed of a shape memory alloy, and a spring disposed to overlap the driving wire, and
wherein the first and second movable bodies are moved by driving force applied in one direction by the driving wire, and driving force applied in another direction by the spring.

2. The camera module of claim 1, wherein the driving unit comprises a plurality of optical image stabilization (OIS) driving units configured to drive the first movable body and an autofocusing (AF) driving unit configured to drive the second movable body.

3. The camera module of claim 2, wherein the plurality of OIS driving units are disposed on two adjacent side surfaces of the first movable body.

4. The camera module of claim 3, wherein the plurality of OIS driving units comprise first and second OIS driving units connected to one side surface of the first movable body, and third and fourth OIS driving units connected to another side surface of the first movable body.

5. The camera module of claim 4, wherein the first OIS driving unit comprises one end connected to an installation bar of the support structure, and the other end connected to a first mounting tool disposed in a central portion of the one side surface of the first movable body.

6. The camera module of claim 5, wherein the first, second, third, and fourth OIS driving units comprise first, second, third, and fourth OIS driving wires, respectively, each having one end connected to the installation bar of the support structure and the other end connected to the first mounting tool, and first, second, third, and fourth OIS coil springs, respectively, each disposed in such a manner that the first, second, third, and fourth OIS driving wires penetrate through the corresponding first, second, third, and fourth OIS coil springs, each having one end connected to the installation bar and the other end connected to the first mounting tool.

7. The camera module of claim 6, wherein the installation bar is disposed on an edge side of the internal space of the support structure, and the first mounting tool comprises a plurality of first mounting tools fixedly installed on two side surfaces of the first movable body.

8. The camera module of claim 7, wherein the plurality of first mounting tools are disposed to be spaced apart from each other in a height direction of the movable body.

9. The camera module of claim 6, wherein the installation bar is disposed on an edge side of the internal space of the support structure, and
the first mounting tool comprises a guide member disposed on two side surfaces of the first movable body, and a sliding member slidably installed on the guide member.

10. The camera module of claim 2, wherein the AF driving unit comprises one end connected to an internal surface of the first movable body, and another end connected to an external surface of the second movable body.

11. The camera module of claim 10, wherein the AF driving unit comprises an AF driving wire comprising one end connected to the internal surface of the first movable body and the other end connected to the external surface of the second movable body, and an AF coil spring disposed in such a manner that the AF driving wire penetrates through the AF coil spring, the AF coil spring comprising one end connected to the internal surface of the first movable body and the other end connected to the external surface of the second movable body.

12. The camera module of claim 10, wherein the AF driving unit comprises a plurality of AF driving units arranged in a 'V' shape.

13. The camera module of claim 10, wherein a ball member, disposed on an opposite side of the second movable body from the AF driving unit, is disposed on one of the first and second movable bodies.

14. The camera module of claim 1, wherein the spring comprises a leaf spring.

15. The camera module of claim 1, wherein the direction and the other direction are opposing directions.

16. A portable electronic device, comprising:
the camera module of claim 1 further comprising an image sensor configured to convert light incident through a lens disposed in the second movable body to an electrical signal; and
a display unit disposed on a surface of the portable electronic device to display an image based on the electrical signal.

* * * * *